May 12, 1942.                F. T. POWERS                 2,282,427
                            PROCESS CAMERA
                         Filed April 13, 1940           2 Sheets-Sheet 1
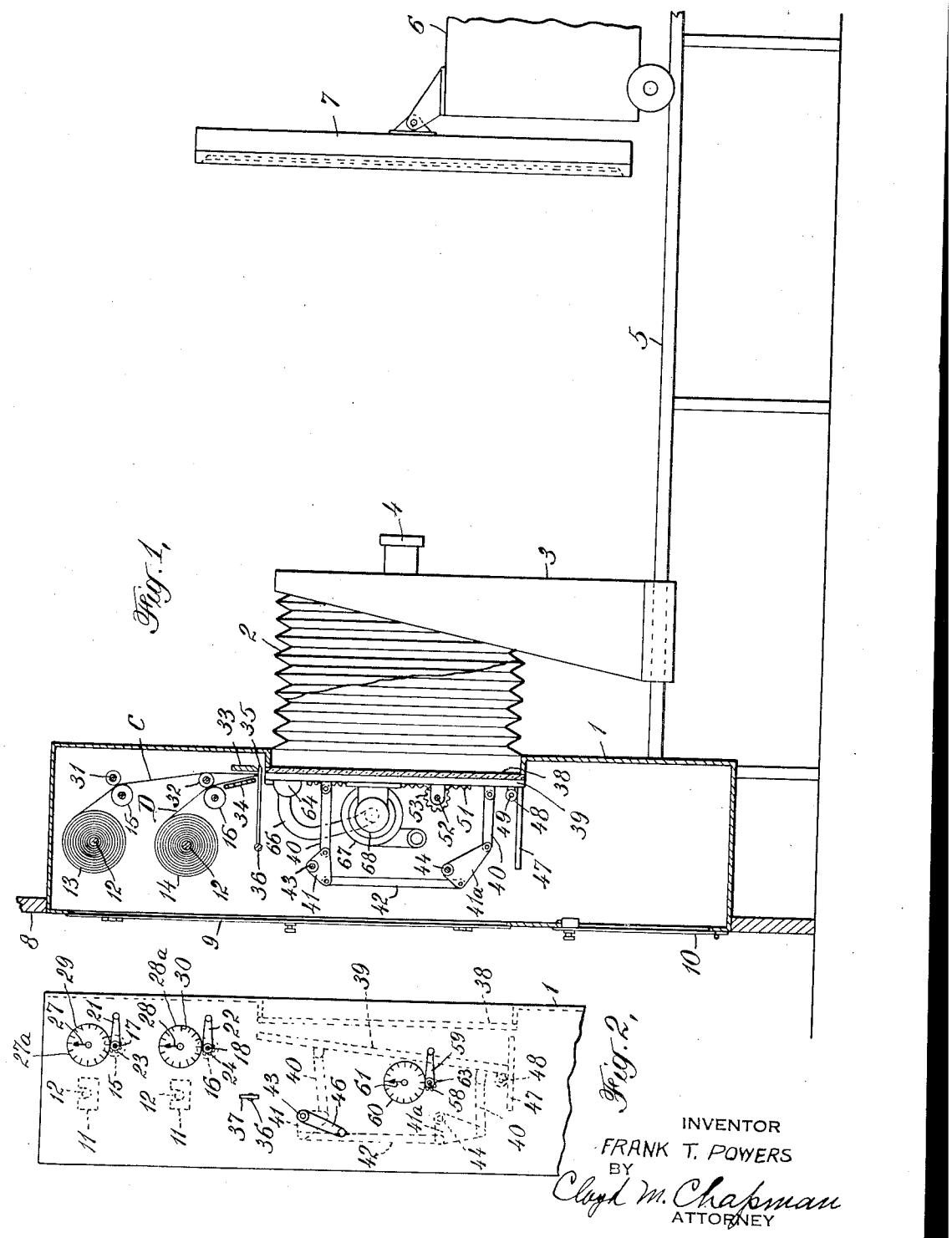
INVENTOR
FRANK T. POWERS
BY
Cloyd M. Chapman
ATTORNEY May 12, 1942.  F. T. POWERS  2,282,427
PROCESS CAMERA
Filed April 13, 1940  2 Sheets-Sheet 2
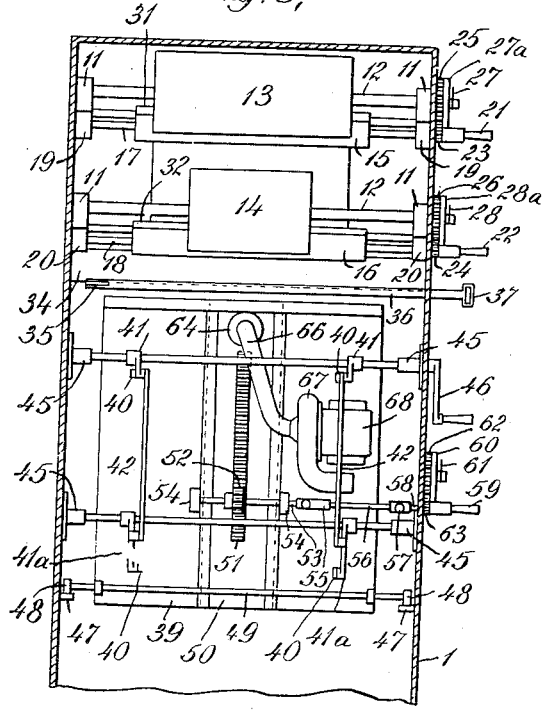
INVENTOR
FRANK T. POWERS
BY
Cloyd M. Chapman
ATTORNEY Patented May 12, 1942

2,282,427

UNITED STATES PATENT OFFICE 2,282,427

PROCESS CAMERA

Frank T. Powers, Glen Cove, N. Y.

Application April 13, 1940, Serial No. 329,499

13 Claims. (Cl. 95—34)

My invention relates to a photographic camera and more particularly to a camera such as is used in process photography and of the class which utilizes a light-sensitive material or film in the form of a roll or a plurality of rolls and have a retractable pressboard adapted to press the film against a focal plane plate of glass or other transparent medium and is provided with mechanism whereby successive portions of the light-sensitive material may be presented for exposure within the image area of the camera, and held in position in the focal plane of the camera between the pressboard and the sheet of glass, herein called a focal plane glass.

The object of the invention is to provide mechanisms for accomplishing the series of necessary operations within the camera, which mechanisms are operable from without the camera.

Other objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel and improved constructions, parts, mechanisms, and features and their arrangements which are herein shown and described.

The accompanying drawings illustrate preferred and alternate embodiments of the invention and, taken together with the description, serve to explain the invention so that one skilled in the art may make and use the same. The embodiments shown and described herein are intended to be illustrative but not restrictive of the invention which may be embodied in various modifications of, or deviations from, the forms shown and described without departing from the spirit thereof, as defined in the appended claims.

Of the drawings:

Fig. 1 is side view, partly in section, of a process camera embodying the invention.

Fig. 2 is a side view of a portion of the camera box.

Fig. 3 is a rear view of the mechanism of the invention within the camera box.

Fig. 4 is a fragmentary detail of the upper portion of the mechanism for positioning the sensitive film in the exposure field.

Fig. 5 is a section on the line AA of the mechanism shown in Fig. 4.

Fig. 6 is a detail of an alternative mechanism for positioning the sensitive film in the image area.

Fig. 7 is a fragmentary detail of the upper portion of the mechanism shown in Fig. 6.

Fig. 8 is a section on the line BB of the mechanism shown in Fig. 7.

In the exemplary embodiment of the drawings, the invention is shown as applied to a process camera of the type having a retractable pressboard used for copying or for making halftone or line negatives in the photo-engraving art, but its use may also be advantageous in connection with other types of cameras and in other applications.

In Fig. 1 there is shown the conventional parts of such a camera which is arranged for operation in connection with a dark room and having the rear of the camera box set in an opening in a wall of the dark room and with the rear of the camera box opening into the dark room.

The conventional parts consist of a camera box 1 attached to the front of which is a bellows 2 connected to a lens support 3 which carries lens 4 and is slidable along a bed 5 which also supports a carriage 6 movable along the bed 5 and which supports a tiltable copy holder 7.

The camera box 1 is customarily set in an opening in a wall 8 of the dark room and is provided with an upper door 9, giving access from within the dark room to the mechanisms and supports for rolls of light-sensitive film within the upper portion of the camera box and with a lower door 10 also giving access from within the dark room to the lower compartment of the camera box for the removal of exposed and severed portions of light-sensitive film, as will be more fully described hereinafter.

Within the camera box 1, on either side wall, are journals 11 adapted to receive shafts 12 which support strips of light-sensitive film in the form of rolls 13 and 14 which constitute the sources of supply referred to hereinafter and in the claims. These strips are of such selected widths as, for the nature and size of the work to be done, may be most advantageous and economical. Measuring rollers 15 and 16 are mounted on shafts 17 and 18 rotatable in bearings 19 and 20. The shafts 17 and 18 project through one side of the camera box and are provided with crank handles 21 and 22 and also with small gears 23 and 24 which mesh with gears 25 and 26 attached to pointers 27 and 28 cooperating with dials 27a and 28a upon which are markings 29 and 30 indicating the length of film turned down, as will be more fully described hereinafter. Adjacent to measuring rollers 15 and 16 and in pressure contact thereon, are rollers 31 and 32 having shafts which are suitably journalled at the sides of the camera box.

Extending across the interior of the camera box, from side to side, are parallel bars 33 and 34 spaced apart to permit the passage of, and to guide the movement of, strips C and D of light-sensitive material from the supply rolls 13 and 14 to the image-receiving area of the camera. Below the bar 33, and in pressure contact with the lower edge thereof, is a knife 35 attached to a rod 36 suitably supported within the camera box, and extending through one of the sides thereof and provided with a handle 37, exterior of the camera, whereby the knife 35 may be drawn along the edge of the bar 33 to sever the strip of light-sensitive film C or D.

In front of the camera box 1 and within the area embraced by the rear end of the bellows 2 is a focal plane glass 38. A rectangular pressboard 39 is adapted to be pressed against the rear surface of the focal plane glass 38 by means of four links 40 located near each of the four corners thereof and pivotally attached at their one end to the pressboard 39 and at their other end to rocker arm plates 41 and 41a which are interconnected by means of links 42 and rigidly fixed on shafts 43 and 44, which are journalled in bearings 45 attached to the sides of the camera box 1. One end of shaft 43 extends through the side of the camera box and is provided with a crank and handle 46 by means of which shaft 43 may be rotated to move the pressboard 39 toward or away from the glass plate 38 or to hold the pressboard with firm pressure against the glass or against the light-sensitive film if interposed therebetween. The weight of the pressboard is supported by, and its motion is guided by, a pair of track members 47 attached to the sides of the camera box and upon which travel small wheels 48 rotatable on the ends of bar 49 attached to the back of the pressboard 39.

It will be noted that the upper pair of rocker arms 41 differ in shape from the lower pair, 41a, the effect of which is to cause the lower end of the pressboard 39 to retract from the focal plane glass 38 a greater distance than does the top end. This is shown by comparison of Figs. 1 and 2 showing the pressboard 39 respectively in contact with the focal plane glass 38 and in a retracted position.

The features of a process camera hereinabove described are of well known character and arrangement, and do not differ fundamentally from those of the camera described in my patent, No. 1,832,656. My present invention lies chiefly in the improvements hereinafter described.

The pressboard 39 is provided with a slidable panel 50 to which is attached a rack 51 engaging a pinion 52 on a shaft 53 journalled in bearings 54, attached to pressboard 39.

One end of shaft 53 is connected by a universal coupling and extension sleeve 55 to one end of a short jack shaft 56, the other end of which is connected by a universal joint 57 to a stub 58 to which is attached a crank handle 59.

A graduated dial 60 cooperating with a pointer 61 attached to a gear 62 actuated by a pinion 63 on stub shaft 58 indicates the distance which the panel 50 is moved down from its uppermost position by means of the rack 51 and pinion 52 when actuated by the crank 59, operable from the outside of the camera.

At the upper end of the slidable panel 50 is a chamber 64, having openings 65 through the forward face of the panel 50. This chamber is connected by means of a suitable flexible duct or tube 66 to the suction inlet of a centrifugal suction fan 67 driven by a motor 68, both of which are attached to, and supported by, the pressboard 39.

In Figs. 6, 7, and 8 I show an alternate construction of the elements described in the last preceding paragraph. In place of the parts 64, 65, 66, 67 and 68, I may use the following described assembly.

At the upper end of the slidable panel 50 I provide a plurality of suction cups 69 of soft rubber which are cemented into openings in the wall of a chamber 70. Within the cup I provide a metal core 71 having a hole in its central portion to permit the passage of air. The chamber 70 is connected by flexible tube 72 to a cylindrical chamber 73 having a plunger 74 therein which is attached to rod 75 to which is attached weight 76. The lever 77 is pivotally attached at 78 to the pressboard 39 and slidably connect at 79 to rod 75. A cable 80, passing through a light trap 81, to the exterior of the box 1, permits the lever 77 and weight 76 together with piston 74 to be raised, expelling the air within the cylinder 73 through the tube 72. Upon release of the cable 80 the downward movement of the piston 74 due to the pull of the weight 76 produces a partial vacuum in the tube 72 and chamber 70 which serves to hold the light-sensitive film in contact with the vacuum cups 69, as, and for the purpose that, will hereinafter appear.

In the operation of my invention I proceed as follows: Having inserted supply rolls of light-sensitive film 13 and 14 in place, I pass the free end of the strip of film C from roll 13 between pressure roller 31 and measuring roller 15 and likewise the free end of the film B from roll 14 between pressure roller 32 and measuring roller 16. The ends of both strips are then passed between bars 33 and 34. With the pressboard 39 retracted in the position shown in Fig. 2 by means of the crank 46, I turn down into the image field of the camera a predetermined portion of either wide or narrow film, by rotating one of measuring rollers 16 or 17 by rotating the corresponding crank 21 or 22. The length in inches turned down is indicated on dial 27a or 28a as the case may be.

By manipulating the lever 46 the pressboard 39 is moved into pressure contact with the focal plane glass 38, thus firmly holding the end of the film in place between the pressboard and the glass. Next, by drawing out the rod 36 by means of the handle 37 the knife 35 is drawn across the edge of the bar 33 severing substantially at the top of the image field that portion of the film which had been turned down into the image field. By starting the motor 68 coupled to fan 67, I produce a partial vacuum in the tube 66 and the chamber 64, thus firmly holding the severed portion of the film against the opening 65 in slidable panel 50. Next I retract the pressboard 39 by manipulating the lever 46 and then by means of crank 59 working through shaft 56, pinion 52, and rack 51, I lower the slidable panel 50 to a position which will place the mid-portion of the severed piece of film in the middle of the image area of the camera. The dial 60 is calibrated and marked so that pointer 61 indicates the position of the center of the strip of film within the image field of the camera. The suction due to the partial vacuum maintained in the chamber 64 by the fan 67 holds the severed portion of film securely against openings 65 in the slidable panel 50 permitting it to be conveyed and positioned accurately in the exposure position at the center of the image field of the camera. The pressboard is then advanced to position in pressure contact with the focal plane glass 38 and the motor 68 is stopped. The pressure of the stationary portion of the pressboard on one side, and of the focal plane glass on the other side holds the detached portion of film firmly in place. The slidable panel is next raised to its normal position by manipulation of the crank 59. The film is now ready for exposure. After exposure the pressboard is again retracted and the loose piece of film permitted to fall to the bottom of the box 1 from which it may be removed by the operator within the dark room through the door 10.

By repetition of this cycle of operations exposures of severed portions of film from a roll or from any one of a plurality of rolls of various widths, and of any desired length, up to the length of the image field of the camera, can be made at a very rapid rate.

Having described my invention and the manner of its construction and use, I now state what I believe to be new and novel and for which I pray that Letters Patent be granted.

I claim:

1. In a process camera of the type adapted to utilize successive variably measured portions of light sensitive film from a source of supply thereof within the camera and to hold said portion in the focal plane of the lens between a pressboard having a movable portion and a focal plane glass during exposure, the combination therewith of means visible from the exterior of the camera for indicating the length of the portion of light sensitive film moved into the image field, means for severing the said measured portion from the remainder of the supply, means for holding said severed portion adjacent to the face of said pressboard while restraining it against movement relative thereto, said source of supply and said holding means being relatively movable whereby the severed sheets may be moved independently of the supply source, said holding means comprising a suction means on said movable portion and applicable to the back of said severed portion and adapted to hold said severed portion in fixed position with respect to the movable portion of said pressboard, means for moving said movable portion for conveying said severed portion into a central portion of the image field of the camera, means visible from the exterior of the camera for indicating the position of said severed portion in the image field of the camera and means for releasing said severed portion.

2. In a process camera of the type adapted to utilize successive variably measured portions of light sensitive film from a source of supply thereof within the camera and to hold said portion in the focal plane of the lens between a pressboard and a focal plane glass during exposure, the combination therewith of means visible from the exterior of the camera for indicating the length of the portion of light sensitive film moved into the image field, means for severing the said measured portion from the remainder of the supply, means for holding said severed portion adjacent to the face of said pressboard while restraining it against movement relative thereto, said source of supply and said holding means being relatively movable whereby the severed sheets may be moved independently of the supply source, said holding means comprising a suction means applicable to the back of said severed portion and adapted to hold said severed portion against movement away from said pressboard, means for conveying said severed portion, while so restrained, into a central portion of the image field of the camera, said conveying means including a vertically movable panel forming a central portion of said pressboard, means visible from the exterior of the camera for indicating the position of said severed portion in the image field of the camera and means for releasing said severed portion.

3. In a process camera of the type adapted to utilize successive variably measured portions of light sensitive film from a source of supply thereof within the camera and to hold said portion in the focal plane of the lens between a pressboard and a focal plane glass during exposure, the combination therewith of means visible from the exterior of the camera for indicating the length of the portion of light sensitive film moved into the image field, means for severing the said measured portion from the remainder of the supply, means for holding said severed portion adjacent to the face of said pressboard while restraining it against movement away therefrom, said source of supply and said holding means being relatively movable whereby the severed sheets may be moved independently of the supply source, means for conveying said severed portion while so restrained, into exposure position in the image field of the camera, said conveying means comprising a movable panel forming a part of said retractable pressboard, adapted to cooperate with an air pump arranged to hold by suction the severed portion against said movable panel, and means for moving said panel carrying said severed portion to place said severed portion in exposure position in the image field of the camera, means visible from the exterior of the camera for indicating the position of said severed portion in the image field of the camera, means visible from the exterior of the camera for indicating the position of said severed portion in the image field of the camera and means for releasing said severed portion.

4. In a process camera of the type adapted to utilize successive variably measured portions of light sensitive film from a source of supply thereof within the camera and to hold said portion in the focal plane of the lens between a pressboard and a focal plane glass during exposure, the combination therewith of means visible from the exterior of the camera for indicating the length of the portion of light sensitive film moved into the image field, means for severing the said measured portion from the remainder of the supply, means for holding said severed portion adjacent to the face of said pressboard while restraining it against movement away therefrom, said source of supply and said holding means being relatively movable whereby the severed sheets may be moved independently of the supply source, said holding means comprising a suction means applicable to the back of said severed portion and adapted to hold said severed portion in fixed position with respect to said pressboard, said suction means comprising an air pump, a plurality of openings in the said pressboard and an air duct connecting the suction side of said pump with said openings, means for conveying said severed portion, while so restrained, into exposure position in the image field of the camera, said conveying means including a vertically movable panel forming a central portion of said pressboard, means visible from the exterior of the camera for indicating the position of said severed portion in the image field of the camera and means for releasing said severed portion.

5. In a process camera of the type adapted to utilize successive variably measured portions of light sensitive film from a source of supply thereof within the camera and to hold said portion in the focal plane of the lens between a pressboard and a focal plane glass during exposure, the combination therewith of means visible from the exterior of the camera for indicating the length of the portion of light sensitive film moved into the image field, means for severing the said measured portion from the remainder of the supply, means for holding said severed portion adjacent to the face of said pressboard while restraining it against movement away therefrom, said source of supply and said holding means being relatively movable whereby the severed sheets may be moved independently of the supply source, said holding means comprising a suction means applicable to the back of said severed portion and adapted to hold said severed portion in fixed position with respect to said pressboard, means for conveying said severed portion, while so restrained, into exposure position in the image field of the camera, said conveying means comprising a movable panel forming a part of said retractable pressboard, adapted to cooperate with an air pump arranged to hold by suction the severed portion against said movable panel, and means operable exteriorly of the camera for moving said panel carrying said severed portion to place said severed portion in exposure position in the image field of the camera, means visible from the exterior of the camera for indicating the position of said severed portion in the image field of the camera and means for releasing said severed portion.

6. In a process camera of the type adapted to utilize successive variably measured portions of light sensitive film from a source of supply thereof within the camera and to hold said portion in the focal plane of the lens between a pressboard and a focal plane glass during exposure, the combination therewith of means visible from the exterior of the camera for indicating the length of the portion of light sensitive film moved into the image field, means for severing the said measured portion from the remainder of the supply, means for holding said severed portion adjacent to the face of said pressboard while restraining it against movement away therefrom, said source of supply and said holding means being relatively movable whereby the severed sheets may be moved independently of the supply source, said suction means comprising an air pump manually operated, a plurality of suction cups in said pressboard and an air duct connecting the suction side of said pump with said suction cups, means for conveying said severed portion, while so restrained, into exposure position in the image field of the camera, said conveying means comprising a movable panel forming a part of said retractable pressboard, adapted to cooperate with an air pump arranged to hold by suction the severed portion against said movable panel, and means operable exteriorly of the camera for moving said panel carrying said severed portion to place said severed portion in exposure position in the image field of the camera, means visible from the exterior of the camera for indicating the position of said severed portion in the image field of the camera and means for releasing said severed portion.

7. In a process camera of the type adapted to utilize successive variably measured portions of light sensitive film from a fixed source of supply thereof within the camera and to hold said portion in the focal plane of the lens between a pressboard and a focal plane glass during exposure, said pressboard having a relatively movable portion, the combination therewith of means visible from the exterior of the camera for indicating the length of the portion of light sensitive film moved into the image field, means for severing the said measured portion from the remainder of the supply, means for holding said severed portion adjacent to the face of said pressboard while restraining it against movement relative to said movable portion, said source of supply and said holding means being relatively movable whereby the severed sheet may be moved independently of the supply source, said holding means comprising a suction means operable on the back of said severed portion and adapted to hold said severed portion in fixed position with respect to said movable portion, means for moving said holding means with respect to said pressboard to center said severed portion in exposure position in the image field of the camera and means for releasing said severed portion.

8. In a process camera of the type adapted to utilize successive variably measured portions of light sensitive film from a source of supply thereof within the camera and to hold said portion in the focal plane of the lens between a pressboard and a focal plane glass during exposure, said pressboard having a relatively movable portion, the combination therewith of means for feeding a predetermined length of the portion of light sensitive film moved into the image field, means for severing the said measured portion from the remainder of the supply, means for holding said severed portion adjacent to the face of said pressboard while restraining it against movement relative to said movable portion, said source of supply and said holding means being relatively movable whereby the severed sheet may be moved independently of the supply source, said holding means comprising a suction means applicable to the back of said severed portion and adapted to hold said severed portion in fixed position with respect to said movable portion, means for moving said holding means with respect to said pressboard to center said severed portion in exposure position in the image field of the camera and means for releasing said severed portion, said suction means comprising an air pump, a plurality of openings in the said pressboard and an air duct connecting the suction side of said pump with said openings.

9. In a process camera of the type adapted to utilize successive variably measured portions of light sensitive film from a source of supply thereof within the camera and to hold said portion in the focal plane of the lens between a pressboard and a focal plane glass during exposure, said pressboard having a relatively movable portion, the combination therewith of means for feeding a predetermined length of the portion of light sensitive film moved into the image field, means for severing the said measured portion from the remainder of the supply, means for holding said severed portion adjacent to the face of said pressboard while restraining it against movement relative to said movable portion, said source of supply and said holding means being relatively movable whereby the severed sheet may be moved independently of the supply source, said holding means comprising a suction means applicable to the back of said severed portion and adapted to hold said severed portion in fixed position with respect to said movable portion, means for moving said holding means with respect to said pressboard to center said severed portion into exposure position in the image field of the camera and means for releasing said severed portion, said suction means comprising an air pump manually operated, a plurality of suction cups in said pressboard and an air duct connecting the suction side of said pump with said suction cups.

10. In a photographic camera, the combination of a support for sensitive sheet material in the focal plane of the camera, said support having fixed and movable portions, a source of supply of sensitive material, means for feeding widely varying lengths of sensitive material to the support, means for severing it from the source of supply and means engageable with the sensitive material and movable with respect to the fixed portion of the support for moving the sensitive material with respect to the support and manually controlled for centering the widely varying lengths of severed sheet material on its support.

11. In a photographic camera, the combination of a support for sensitive sheet material in the focal plane of the camera, a source of supply of sensitive material, means for feeding widely varying lengths of sensitive material to the support, means for severing it from the source of supply and means engageable with the sensitive material and manually controlled for moving the sensitive material over the surface of its support to center the widely varying lengths of severed material on their support.

12. In a photographic camera, the combination of a support for widely varying lengths of sensitive material in sheet form in the focal plane and exposure area of the camera, means for releasably holding the material against its support, a source of supply for the sensitive material, and suction means engageable with the back of the sheet and movable relative to the support and source of supply to center varying length sheets relative to the exposure area.

13. In a process camera, the combination of a support for widely varying lengths of sensitive sheet material in the focal plane and exposure area of the camera, means for releasably holding the material against its support, means for feeding successive sheets of said material of variable length to the support, suction means for engaging the back of the sheet material mounted on the support and movable relatively thereto to center the widely varying lengths of sheets relatively to the exposure area and means for controlling the suction and releasable holding means to hold and release the sheets.

FRANK T. POWERS.